Sept. 8, 1953

H. B. FOSTER ET AL 2,651,758

MODULATION CIRCUIT

Filed June 27, 1951

INVENTORS
Harry B. Foster &
Joseph R. Parker
BY
Charles H. Brown
ATTORNEY

Patented Sept. 8, 1953

2,651,758

UNITED STATES PATENT OFFICE 2,651,758

MODULATION CIRCUIT

Harry Bliss Foster, Ellisburg, and Joseph R. Parker, Haddon Heights, N. J., assignors to Radio Corporation of America, a corporation of Delaware Application June 27, 1951, Serial No. 233,858

12 Claims. (Cl. 332—38)

This invention relates to a modulation circuit, and more particularly to a circuit of the suppressor-grid-modulation type, useful in connection with radio frequency (R. F.) power amplifiers.

An object of this invention is to devise a novel arrangement for automatically preventing overmodulation of suppressor modulated R. F. power amplifiers.

Another object is to provide a relatively simple arrangement for limiting the modulation in a suppressor grid modulation circuit, a circuit which is particularly suitable for low power, light weight equipment, wherein the expense and weight of other types of modulation circuits would involve serious drawbacks.

A further object is to devise a suppressor modulation circuit in which the modulation peaks if higher than a predetermined value automatically cause a suppressor grid bias to be developed which supplements the original bias.

The foregoing and other objects of this invention will be best understood from the following description of an exemplification thereof, reference being had to the accompanying drawing, wherein.

Figures 1, 2:
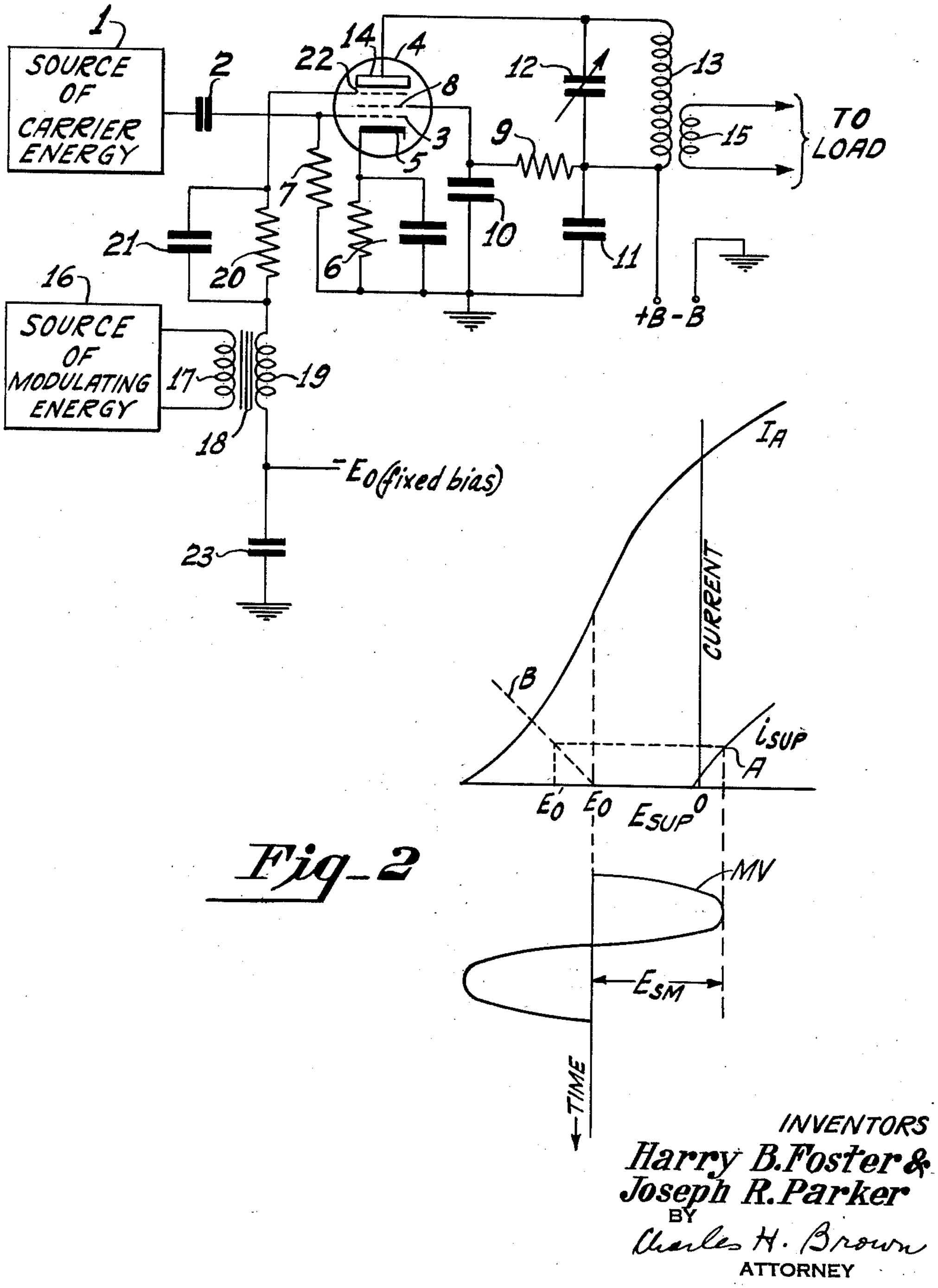
Fig. 1 is a schematic diagram of a circuit according to this invention.
Fig. 2 is a set of curves useful in explaining the invention.

The objects of this invention are accomplished, briefly, in the following manner: In a suppressor grid modulation circuit, a resistor and a capacitor in parallel are inserted in series in the suppressor-grid-to-cathode circuit. In response to suppressor grid current flow, a bias voltage is developed across this R. C. combination to supplement the original suppressor grid bias, to prevent overmodulation.

Referring now to Fig. 1, carrier energy is fed from a suitable source 1 through a coupling capacitor 2 to the control grid 3 of a pentode vacuum tube 4, which is connected to act as a suppressor-modulated R. F. power amplifier, as will hereinafter become more apparent. Tube or electron discharge device 4 has a cathode 5 which is connected to ground through a conventional R. C. biasing network 6. The usual grid leak resistor 7 is connected between the grid side of capacitor 2 and ground. The screen grid 8 of tube 4 is supplied with potential from the positive terminal +B of a suitable source of unidirectional potential +B through a dropping resistor 9 and is by-passed to ground by capacitor 10. The source of potential +B is by-passed to ground via capacitor 11. A parallel resonant or tuned output circuit, comprising a variable capacitor 12 and an inductance 13, is connected between the positive terminal +B of the potential supply and the anode 14 of tube 4. An inductance 15 is coupled to inductance 13 and supplies the output of tube 4 to a suitable load, such as an antenna.

In order to modulate the carrier wave energy supplied to control grid 3, so that the amplified radio frequency energy appearing at anode 14 will be amplitude modulated, a source of modulating energy 16, which may be speech or any audio frequency, for example, supplies this modulating energy to the primary winding 17 of a modulating transformer 18 having a secondary winding 19. One end of winding 19 is connected through a parallel R. C. circuit, consisting of a resistor 20 and a capacitor 21, to the suppressor grid 22 of tube 4. The opposite end of winding 19 is connected through a source of fixed unidirectional bias voltage $E_0$ to ground. Thus, it may be seen that the circuit 20, 21 is in the suppressor-grid-to-cathode circuit of tube 4 in series with the winding 19 and the fixed bias source, since cathode 5 of tube 4 is connected to ground through network 6. Frequencies higher than the highest modulating frequency are by-passed to ground from the suppressor grid circuit by means of capacitor 23 connected between the lower end of winding 19 and ground.

In the circuit of Fig. 1, suppressor modulation is accomplished by varying the voltage on suppressor grid 22 at modulation rate (by way of transformer winding 19) about a fixed unidirectional bias voltage $E_0$ which is negative with respect to cathode 5. In the ideal case, the suppressor bias voltage $E_0$ is one-half that for which zero power output obtains. Peak power output in the modulation cycle then occurs when the suppressor grid is at zero voltage. This may be seen by reference to Fig. 2, in which suppressor current is plotted against voltage. The curve labeled $I_A$ represents anode current in tube 4 and the vertical line indicates zero suppressor voltage. The bias voltage $E_0$ is negative and is one-half that for which zero anode current or power output obtains (that is, $E_0$ has a value which is one-half the voltage value at the point of intersection of the $I_A$ curve with the suppressor voltage axis). The curve MV represents a single cycle of audio frequency modulating voltage; it will be seen that this modulating voltage varies or swings about a fixed zero axis which is located at $E_0$.

Since peak power output in the modulation cycle occurs when the suppressor grid is at zero voltage, overmodulation occurs when the suppressor grid is driven positive on the modulation peaks, that is, when the peak value $E_{sm}$ of the modulating voltage exceeds the fixed bias $E_0$, which is the condition illustrated in Fig. 2. When the suppressor grid 22 is driven positive, current is drawn by this grid, as illustrated by the curve labeled $i_{sup}$, which represents suppressor grid current. This amount of suppressor grid current, determined by the point A on the $i_{sup}$ curve, flows through resistor 20, which is in series in the suppressor-grid-to-cathode circuit. Resistor 20 is, of course, by-passed for higher frequencies by capacitor 21. The flow of current through resistor 20 produces an IR voltage drop thereacross, the amount of which is determined by the IR voltage drop line B. The voltage developed across resistor 20 is a suppressor grid bias voltage (since it is in the suppressor-cathode circuit) and has a polarity such as to bias the suppressor negatively, so that this developed bias voltage adds to, supplements, or increases the original negative bias $E_0$, to provide a new increased negative bias $E_0'$. As a result, the base line or zero axis of the modulating voltage is effectively shifted bodily to the left in Fig. 2 or toward the negative side, so that the peaks of the modulation no longer drive the suppressor grid positive and overmodulation is prevented. Thus, the operating bias on the suppressor grid is automatically changed, the modulation is limited and overmodulation is prevented. Although some distortion due to clipping occurs when the base line of the modulation is shifted from $E_0$ to $E_0'$, with the proper values of resistor 20 and shunt capacitor 21 the modulation is limited to less than 100% (overmodulation is prevented) and the distortion is low enough for good communication work, being less than 15% at 90% modulation.

Summarizing the operation of the circuit of this invention, when overmodulation occurs the suppressor grid is driven positive on the modulation peaks and the resultant current drawn by the suppressor on these peaks develops a voltage across resistor 20 which increases the bias on the suppressor so that the modulation peaks no longer drive the suppressor grid positive, thus automatically preventing overmodulation by preventing the suppressor grid from going beyond the zero-voltage point corresponding to peak power output.

In a typical circuit according to this invention which was actually built and tested, the carrier energy had a frequency lying in the 2–12 megacycle range. Certain of the components in this actually-built device had values as follows. It is to be understood that these values are given by way of example only and not by way of limitation.

| | |
|---|---|
| Resistor 20 | 2200 ohms. |
| Capacitor 21 | 0.1 mfd. |
| Bias voltage $E_0$ (neg.) | Approx. 50 v. |
| Tube 4 | Type 2E22. |

What we claim as our invention is:

1. In a modulation circuit, an electron discharge device having at least a control grid, a suppressor grid and an output electrode, means for applying carrier energy to said control grid, means for applying modulating energy to said suppressor grid to modulate the amplitude of the carrier energy appearing at said output electrode, means providing an operating bias on said suppressor grid, and means in circuit with said suppressor grid and responsive to suppressor grid current flow, for increasing said bias.

2. In a modulation circuit, an electron discharge device having at least a control grid, a suppressor grid and an output electrode, means for applying carrier energy to said control grid, means for applying modulating energy to said suppressor grid to modulate the amplitude of the carrier energy appearing at said output electrode, means for biasing said suppressor grid negatively with respect to a reference point, and means responsive to suppressor grid current flow for increasing the negative bias on said suppressor grid.

3. In a modulation circuit, an electron discharge device having at least a control grid, a suppressor grid and an output electrode, means for applying carrier energy to said control grid, means for applying modulating energy to said suppressor grid to modulate the amplitude of the carrier energy appearing at said output electrode, means providing an operating bias on said suppressor grid, and an impedance in a series circuit arrangement with said suppressor grid, suppressor grid current flow through said impedance producing a voltage drop thereacross which changes said bias.

4. A modulation circuit in accordance with claim 3, wherein said impedance is a resistor.

5. In a modulation circuit, an electron discharge device having at least a control grid, a suppressor grid and an output electrode, means for applying carrier energy to said control grid, means for applying modulating energy to said suppressor grid to modulate the amplitude of the carrier energy appearing at said output electrode, means providing an operating bias on said suppressor grid, and an impedance in a series circuit arrangement with said suppressor grid, suppressor grid current flow through said impedance producing a voltage drop thereacross which increases said bias.

6. In a modulation circuit, an electron discharge device having at least a control grid, a suppressor grid and an output electrode, means for applying carrier energy to said control grid, means for applying modulating energy to said suppressor grid to modulate the amplitude of the carrier energy appearing at said output electrode, means for biasing said suppressor grid negatively with respect to a reference point, and an impedance in a series circuit arrangement with said suppressor grid, suppressor grid current flow through said impedance producing a voltage drop thereacross which increases the negative bias on said suppressor grid.

7. A modulation circuit in accordance with claim 6, wherein said impedance is a resistor.

8. In a modulation circuit, an electron discharge device having at least a control grid, a suppressor grid, a cathode and an output electrode, means for applying carrier energy to said control grid, means for applying modulating energy to said suppressor grid to modulate the amplitude of the carrier energy appearing at said output electrode, means for biasing said suppressor grid negatively with respect to said cathode, and means responsive to suppressor grid current flow for increasing the negative bias on said suppressor grid.

9. In a modulation circuit, an electron discharge device having at least a control grid, a suppressor grid, a cathode and an output electrode, means for applying carrier energy to said control grid, means for applying modulating energy to said suppressor grid to modulate the amplitude of the carrier energy appearing at said output electrode, means for biasing said suppressor grid negatively with respect to said cathode, and an impedance in a series circuit arrangement with said suppressor grid, suppressor grid current flow through said impedance producing a voltage drop thereacross which increases the negative bias on said suppressor grid.

10. A modulation circuit in accordance with claim 9, wherein said impedance is a resistor connected between the suppressor grid and the means for applying modulating energy to such grid.

11. In a modulation circuit, an electron discharge device having at least a control grid, a suppressor grid and an output electrode, means for applying carrier energy to said control grid, a modulation transformer having one end of its secondary winding coupled to said suppressor grid, means for applying a modulating signal to said transformer, thereby to modulate the amplitude of the carrier energy appearing at said output electrode, means coupled to the other end of said secondary winding for providing an operating bias on said suppressor grid, a resistor connected between said one end of said secondary winding and said suppressor grid, and a capacitor connected across said resistor.

12. A modulation circuit in accordance with claim 11, including also a bypass capacitor connected between the said other end of the secondary winding and a point of zero reference potential.

HARRY BLISS FOSTER.
JOSEPH R. PARKER.

References Cited in the file of this patent

"Suppressor-Grid Modulation," Lamb, pages 19–22 of QST for March 1934.

Radio Engineering by Terman, section 75, pages 407–409, published 1937.